UNITED STATES PATENT OFFICE.

HERBERT H. MEYERS, OF PITTSBURGH, PENNSYLVANIA, ASSIGNOR TO ARMOUR FERTILIZER WORKS, OF CHICAGO, ILLINOIS, A CORPORATION OF NEW JERSEY.

MANUFACTURE OF CHLORIN.

1,311,175.     Specification of Letters Patent.     Patented July 29, 1919.

No Drawing.     Application filed July 3, 1918. Serial No. 243,117.

*To all whom it may concern:*

Be it known that I, HERBERT H. MEYERS, a citizen of the United States, residing at Pittsburgh, in the county of Allegheny, State of Pennsylvania, have invented certain new and useful Improvements in the Manufacture of Chlorin; and I do hereby declare the following to be a full, clear, and exact description of the invention, such as will enable others skilled in the art to which it appertains to make and use the same.

In the well-known "Deacon" process for the catalytic production of chlorin from hydrochloric acid, in accordance with the equation $4HCl + O_2 = 2Cl_2 + 2H_2O$, porous brick, unglazed porcelain, or the like, impregnated with copper chlorid or copper sulfate was usually employed as the catalyst. As far as is generally known, these substances were the only catalysts used in practice, as they were found to produce higher yields than any others suggested.

However, there are serious difficulties involved in the use of copper chlorid or copper sulfate in the Deacon process. Prominent among these difficulties are the following:

1. The tendency for the copper salts to volatilize at the optimum temperature for the reaction, thus causing a large loss of copper;

2. The ease with which the catalyst becomes "poisoned", that is to say, loses its catalyzing efficiency by reason of impurities in the reacting gases, thus necessitating the frequent renewal of the catalyst;

3. The difficulties involved in attempting to recover the copper from the spent catalytic body, so that it was usually considered more economical to discard the spent catalytic body entirely;

4. The cost involved in the frequent renewal of the catalyst; and

5. The comparatively large tonnage of the catalytic mass or body required per unit of chlorin produced.

The present invention is based upon the discovery that if mineral alunite is heated for a sufficient period of time (say for from two to three hours at a temperature maintained between 600° C. and 800° C.) and is then used as a catalyst, the yield of chlorin from the reacting gases which pass through the alunite, will be at least equal to the yield obtained when copper salts are employed as the catalyst, and with practically none of the disadvantages hereinbefore referred to, incident to the employment of the copper salts. The reacting gases will consist of a mixture of hydrochloric acid vapors with the oxidizing gas employed, which oxidizing gas may be either atmospheric air, pure oxygen, or a mixture of atmospheric air and oxygen.

Thus, for example, when a mixture of air and hydrochloric acid in the proportion of 70% by volume of air and 30% by volume of hydrochloric acid vapor is passed through a body of the mineral alunite which has been subjected to the heat treatment hereinbefore specified, the conversion of the hydrochloric acid to chlorin is found to be consistently as high as from 55 to 60%. Still higher yields are obtained when instead of atmospheric air, pure or practically pure oxygen is employed in the mixture, or when the air-hydrochloric acid mixture is enriched by the addition of oxygen.

It is preferred, as hereinbefore indicated, to preliminarily heat the mineral alunite before employing it as the catalyst; for the reason that by this preheating the alunite certain constituents thereof are driven off and removed, as, for instance, the moisture present and the major part of the combined sulfur, so that the alunite is, to a large extent, not only dehydrated, but in a more or less porous condition, due to the extent to which the sulfur has been expelled. The preheating is preferably effected in an exteriorly heated muffle, so that the alunite will be out of contact with the products of combustion used for heating the muffle, and the muffle will be vented so as to permit the passing off of the vaporized moisture and the sulfur gases. It will also be understood that, depending upon the condition and composition of the alunite and the length of time to which it is exposed to the preheating temperature, the preheating temperature may, in some instances, be raised to a higher degree, having in mind the desirability of increasing the porosity of the lumps of alunite, but, at the same time, taking care that such increase shall not proceed beyond the limit where the sustaining power or effectiveness of the alunite as a catalyst would be endangered. On the other hand, it will be desirable not to carry on this preheating operation under such conditions as will cause the lumps of alunite to break down and become compacted so as to interfere seriously with the passage of the reacting gases therethrough. While, as stated, it is desirable to preheat the alunite to the extent and for the purpose described, this preheating may, with somewhat inferior results, be dispensed with, inasmuch as the mineral alunite itself without such preheating, is available to an important degree as a catalyzing agent in the process.

When thus employed as the catalytic agent in the Deacon process, the mineral alunite has no tendency to volatilize, is not easily poisoned by impurities in the reacting gases, and (to the extent that it may be ultimately poisoned after long continued use) can be completely revivified by merely again heating it to from 600° C. to 800° C. for a period of from two to three hours. So also, the amount of mineral alunite required per unit of chlorin is less than the amount of porous brick or unglazed porcelain impregnated with the copper salts in the same process, and the original cost of producing the catalytic body as a whole is materially less. Moreover, after the mineral alunite has been used as a catalyst in the production of chlorin, as herein contemplated, it is more valuable commercially than before, for the reason that the potash values contained therein are rendered soluble as an incident to the manufacture and are recoverable, as well as the alumina.

It will be understood that, as in the Deacon process, for the recovery of chlorin from a mixture of air or oxygen and hydrochloric acid, so also, in the practice of the present invention, it will be desirable to preheat the said mixture before it is admitted into the decomposing chamber containing the catalyzer body. In general, the process of the present invention is carried out under conditions approximately the same as in the Deacon process. In practice, it will be convenient and desirable to crush the mineral alunite employed to lumps of say one cubic inch size, or thereabout, so as to provide the necessary intercommunicating spaces throughout the mass for the ready passage of the reacting gases.

Having thus described my invention, what I claim is:

1. The method of making chlorin, which comprises passing a gas mixture containing hydrochloric acid vapor and oxygen through a catalytic body of mineral alunite; substantially as described.

2. The method of making chlorin, which comprises passing a gas mixture containing hydrochloric acid vapor and oxygen through a catalytic body of mineral alunite from which the major part of the combined sulfur has been preliminarily expelled; substantially as described.

In testimony whereof I affix my signature.

HERBERT H. MEYERS.